Sept. 18, 1951     R. H. WEISERT     2,568,045
GRASS CATCHING ATTACHMENT FOR LAWN MOWERS
Filed Oct. 15, 1948     2 Sheets-Sheet 1
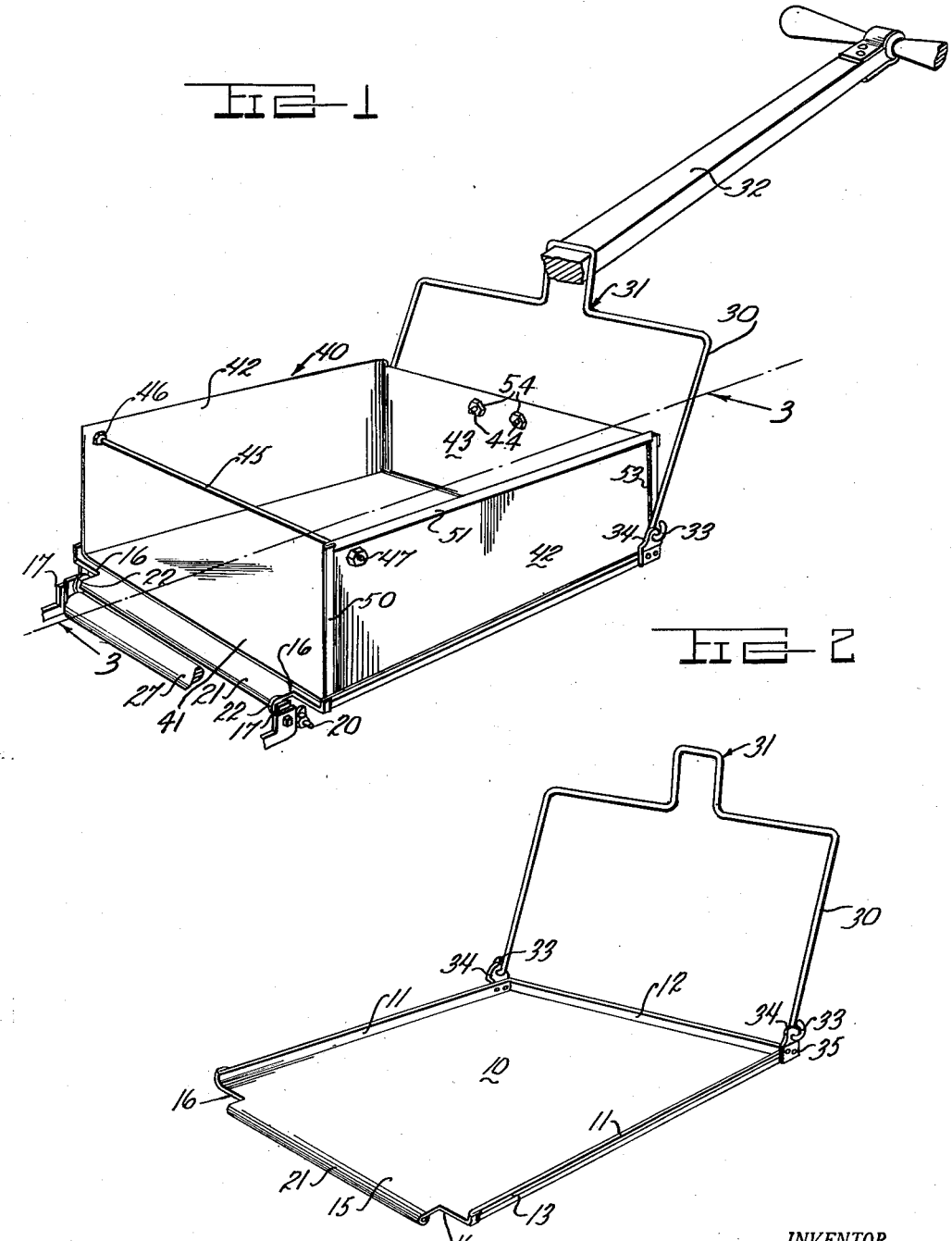
INVENTOR.
Ray H. Weisert
BY
McMorrow, Berman & Davidson
ATTORNEYS

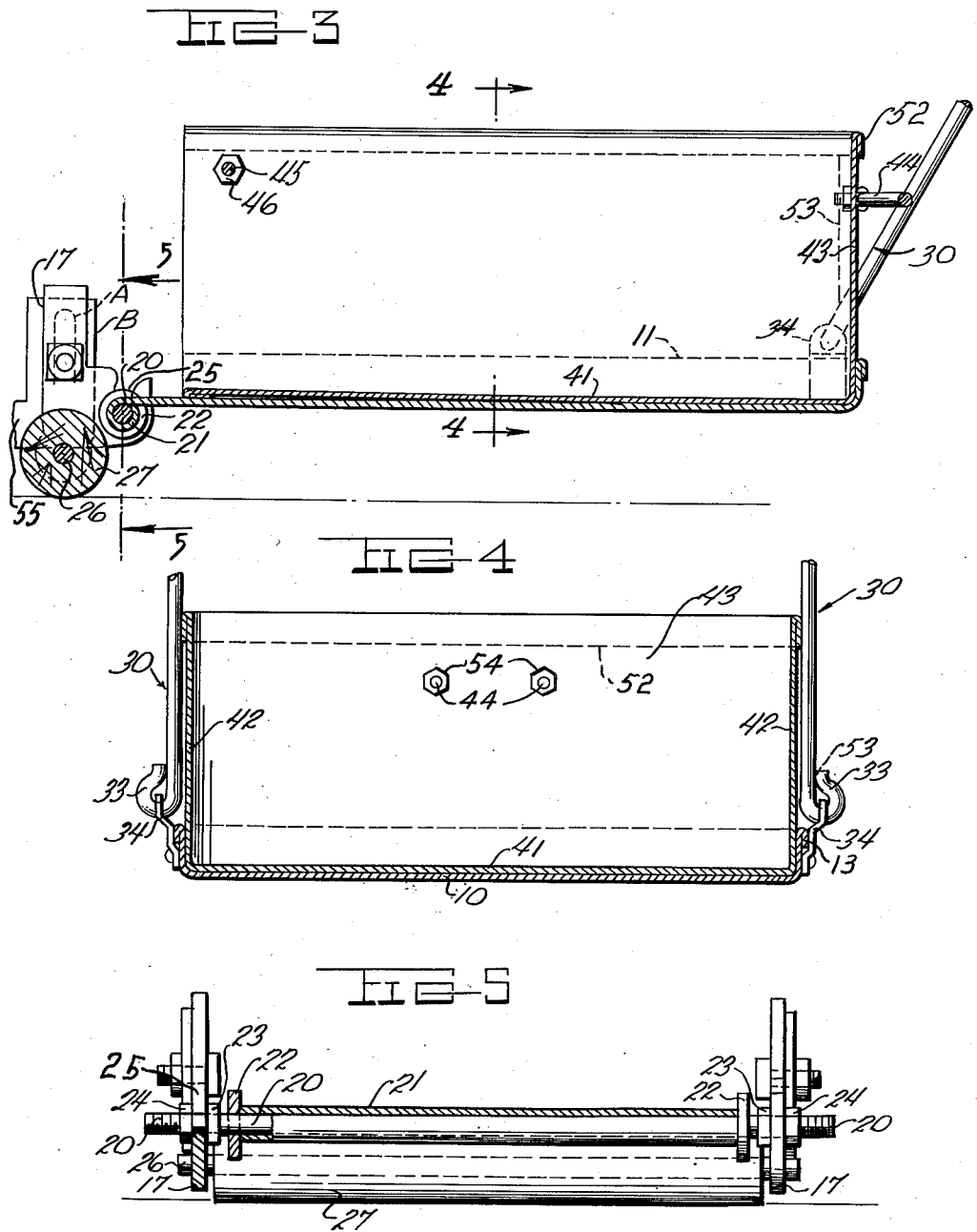

Patented Sept. 18, 1951

2,568,045

UNITED STATES PATENT OFFICE 2,568,045

GRASS CATCHING ATTACHMENT FOR LAWN MOWERS

Ray H. Weisert, Redland, Calif.

Application October 15, 1948, Serial No. 54,627

1 Claim. (Cl. 56—202)

This invention relates to an attachment for lawn mowers and is more particularly directed to a grass catcher.

An object of the invention is the provision of a simple and durable catcher for grass which may be attached to or readily detached from a lawn mower by nuts threaded onto the ends of a supporting rod mounted on the forward end of a tray or carriage for a grass-receiving receptacle, the ends of said rod being received by slots or passages in the usual adjustable supporting plates for the roller of the lawn mower.

A further object of the invention is the provision of an attachment for lawn mowers in the form of a grass catcher in which a supporting tray has one end suspended from the handle for the mower while the other end is connected removably to the usual adjusting plates for the blade-supporting roller, a receptacle for grass being seated on the tray and having an open end facing the mower, the receptacle being stamped from a single sheet of metal with the exposed edges of the walls being inturned to provide a smooth surface to prevent injury to the hands of the operator, said receptacle being mounted removably on the supporting tray so that when the receptacle is filled it may be withdrawn and emptied.

The invention is best understood from a consideration of the following detailed description in connection with the accompanying drawings forming part of the specification, nevertheless, it is to be understood that the invention is not confined to the disclosure but is susceptible of such changes and modifications as shall define no material departure from the salient features of the invention as expressed in the appended claim.

In the drawings:

Figure 1 is a view in perspective of my grass catcher attached to lawn mower elements and composed of a receptacle and a supporting tray, Figure 2 is a view in perspective of the supporting tray for the receptacle which catches the grass, Figure 3 is a cross-sectional view on an enlarged scale on the line 3—3 of Figure 1, Figure 4 is a transverse vertical section taken along the line 4—4 of Figure 3, Figure 5 is a transverse vertical section taken along the line 5—5 of Figure 3.

Referring more particularly to the drawings, 10 designates a tray or support which is formed of metal and which is provided with parallel side flanges 11 and a rear flange 12. Each of the flanges is formed integrally with the corresponding edges of the tray and has a return bent or beaded over portion 13 to provide a smooth finish to prevent cutting of the hands of the operator. The front end 15 of the tray extends beyond the adjacent ends of the side flanges 11 and is cutaway at the front corners of the tray, as shown at 16, to receive the lawn mower roller supporting brackets 17 for a purpose which will be explained presently.

A rod 20 is received by a sleeve formation 21 formed at the front end of the tray 10 and extending longitudinally of the front end between the cutaway corners or notches 16. Washers 22 are welded or soldered in spaced relation on the rod and abut the ends of the sleeve formation. The rod is threaded at its opposite ends to receive pairs of spaced nuts 23 and 24. The ends of the rods are disposed in slots or openings 25 formed usually in the brackets 17 which are adjustable on the frame 55 of the mower at the rear of the frame. The brackets provide bearings for the ends 26 of an axle 26 of a roller 27 which rolls on the ground at the rear of the mower and retains the usual blade (not shown) of the mower at the proper height above the ground. It will be noted from Figure 5, that the nuts 23 and 24 are drawn up tight against the opposite faces of the brackets 17 for retaining the rod 20 rigidly in place so that the tray 10 may have a hinging action on the rod.

The rear end of the tray 10 is supported by a bail 30 which has a narrow U-shaped extension 31 substantially at its mid-length location for receiving the usual operating handle or tongue 32 of the mower. The lower free ends of the legs of the bail are provided with hooks 33 engaged in apertures in ears 34 secured one to each of the side flanges 11 of the tray at the rear end of the side flanges, as indicated at 35.

A receptacle, generally designated by the numeral 40, has a bottom wall 41 adapted to rest on the tray 10. Side walls 42 and a rear end wall 43 rise from the side and end edges of the bottom wall 41. A handle 44 is secured to the end wall by nuts 54 threaded onto the ends of the U-shaped handle, and is employed for raising the receptacle from the tray. A brace bar 45 connects the side walls 42 together at the front upper corners thereof. Nuts, as indicated at 46 and 47 are threaded on the opposite ends of the rod and are disposed at opposite faces of the side walls for securing the rod and the side walls in position. Thus the forward or inner end of the receptacle is open to collect the grass cut by the mower.

In order to protect the hands of the operator of the mower from injury when the receptacle is manufactured of metal, the front ends of the side walls are bent back, as shown at 50, to form smooth edges. The top edges of the side walls are bent downwardly as indicated at 51 for the same purpose. Likewise, the top edge of the rear wall is bent downwardly as indicated at 52 (Fig. 3). It will be noted that the receptacle 40 is formed from a single sheet of metal so that the side walls 42 and the end wall 43 are bent upwardly from the bottom 41. Flanges 53 are bent inwardly from the opposite ends of the rear wall 43 of the receptacle and secured to the outer faces of the side walls 42.

After the receptacle has been filled with grass, it is removed by raising the rear end thereof by the handle 44 above the rear flange 12 on the tray 10. The receptacle is then pulled rearwardly through the bail 30 until it clears the tray and the contents is discharged after which the receptacle is returned to the tray.

What I claim:

A grass catching attachment for a lawn mower having roller attaching brackets and a tongue comprising a supporting tray having a bottom wall provided with a sleeve formation along its front edge and upstanding flanges disposed one along each side edge and one along the rear edge thereof, said bottom wall having cutaway front corners to receive the roller attaching brackets of an associated lawn mower, a rod rotatably received in said sleeve formation and extending therethrough, said rod having screw-threaded end portions adapted to engage the roller mounting brackets of an associated lawn mower, nuts threaded onto the screw-threaded end portions of said rod for locking the rod to an associated lawn mower structure, a bail having its legs pivotally connected at their ends to the tray at the rear end of said bottom wall and at respectively opposite sides of the latter, said bail having an extension substantially at its mid-length location for receiving a lawn mower tongue, and a receptacle supported on said tray within said flanges and including a bottom wall, side walls extending from said bottom wall and extending one along each side edge of the latter, a rear wall upstanding from and extending along the rear edge of the bottom wall, the front end of said receptacle being open, a rod extending between and interconnecting said side walls at the upper front corners thereof, and a handle secured to said rear wall and extending rearwardly therefrom for lifting said receptacle over the rear flange of said tray and moving the receptacle rearwardly from the tray between the rear legs of said bail.

RAY H. WEISERT.

REFERENCES CITED

The following references are of record in the file of this patent:

UNITED STATES PATENTS

| Number | Name | Date |
| --- | --- | --- |
| 421,370 | Kelley | Feb. 11, 1890 |
| 939,068 | McGrath | Nov. 2, 1909 |
| 997,327 | Richardson | July 11, 1911 |
| 1,826,605 | Dees | Oct. 6, 1931 |
| 2,191,601 | Wessock | Feb. 27, 1940 |